Dec. 19, 1933.  E. J. O'NEILL  1,940,182
MACHINE FOR MAKING SANITARY NAPKINS
Filed March 10, 1932  8 Sheets-Sheet 1

Fig. 1.

Inventor
Edward J. O'neill

Geo. P. Kimmel
Attorney

Fig. 2.

Dec. 19, 1933.  E. J. O'NEILL  1,940,182
MACHINE FOR MAKING SANITARY NAPKINS
Filed March 10, 1932  8 Sheets-Sheet 3

Inventor
Edward J. O'neill
Geo. P. Kimmel
Attorney

Dec. 19, 1933.  E. J. O'NEILL  1,940,182
MACHINE FOR MAKING SANITARY NAPKINS
Filed March 10, 1932  8 Sheets-Sheet 4

Inventor
Edward J. O'Neill
Geo. P. Kimmel
Attorney

Dec. 19, 1933.  E. J. O'NEILL  1,940,182
MACHINE FOR MAKING SANITARY NAPKINS
Filed March 10, 1932    8 Sheets-Sheet 7

Inventor
Edward J. O'neill

By Geo. P. Kimmel
Attorney

Dec. 19, 1933. E. J. O'NEILL 1,940,182
MACHINE FOR MAKING SANITARY NAPKINS
Filed March 10, 1932  8 Sheets-Sheet 8

Inventor
Edward J. O'neill
By Geo. P. Kimmel
Attorney

Patented Dec. 19, 1933

1,940,182

UNITED STATES PATENT OFFICE 1,940,182

MACHINE FOR MAKING SANITARY NAPKINS

Edward J. O'Neill, Syracuse, N. Y.

Application March 10, 1932. Serial No. 598,055

29 Claims. (Cl. 223—15)

My invention relates to a machine for making sanitary napkins.

The essential objects of my invention are to simplify and improve the constructive arrangement of the machine forming the subject matter of Letters Patent No. 1,845,436 granted to me February 16, 1932; to conserve time, space and labor in the manufacture of sanitary napkins and to produce the latter in a uniform manner; to prevent the severed ends of the web of the pad covering material from sticking to the cutter device of the machine when severing the assembled covering material and pads to provide napkins of uniform width; to provide a pair of superposed, hinged, adjustable elements for folding the marginal portions of the web of covering material in overlapped relation; to prevent the distortion of the sides or bunching of the pads during folding of the marginal portions of the web of the covering material in overlapped relation and superimposed with respect to the pads; to prevent the retarding of the travel of the pads when guided in a direction to seat upon the covering material therefor; to provide an adjustable means for positioning the assembled materials in the path of the cutter device; to provide for readily removing a holding down element for the assembled materials in case of congestion due to the latter; and to attain these ends in a strong, durable, compact, thoroughly efficient, conveniently repaired, readily assembled and a comparatively inexpensive structure.

To the above ends essentially and others which may hereinafter appear, my invention consists of such parts, and such combination of parts which fall within the scope of the invention as claimed.

In the drawings:

Figure 7 is a section on line 7—7 Figure 4.

Referring to the drawings in detail, the machine includes a skeleton frame upon which the working parts of the machine are mounted. The frame includes a forward part A, an intermediate part B and a rear part C. The parts A and B are of the same width, but the latter is of greater height than that of the former. The parts B and C are of the same height but the latter is of greater width than the former.

The machine includes pad forming and feeding means arranged upon frame part C. Assembling means for the pads and covering are supporting upon frame part B; and severing means is carried by frame part A for the covering to provide the napkins. The pads are formed on frame part C and feed to the covering upon frame part B.

Figure 1:
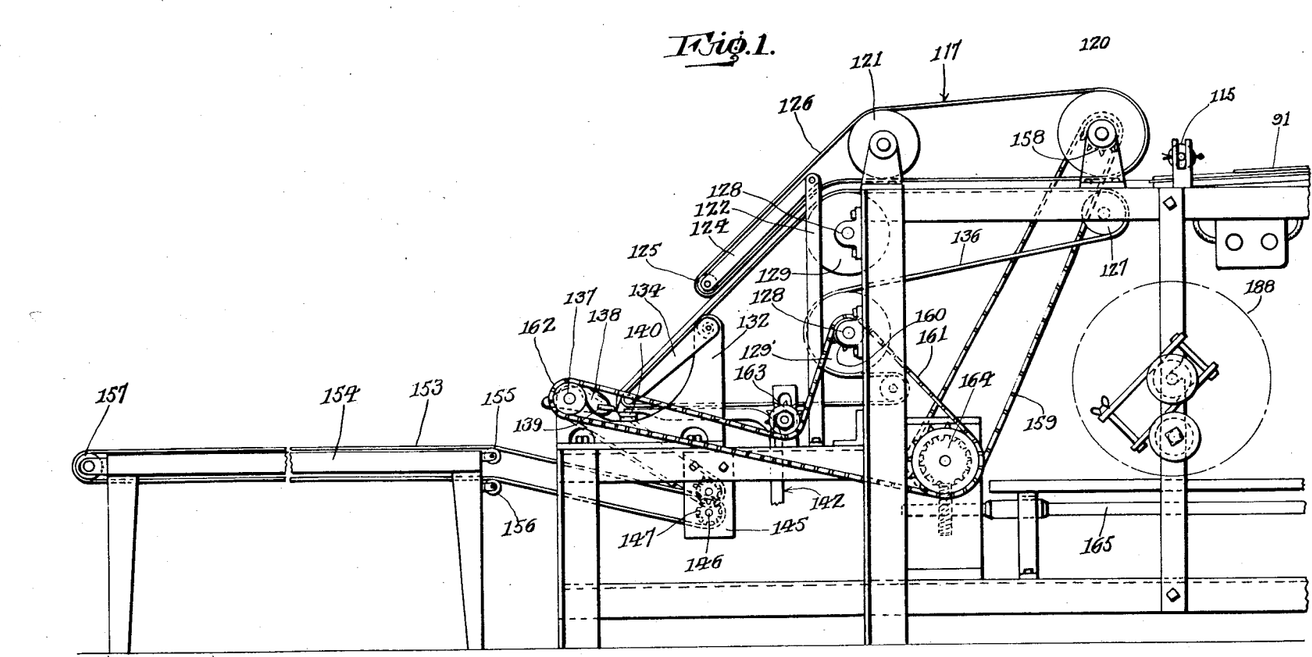
Figures 1 and 2 when taken together illustrate the machine in side elevation.
Figure 2:
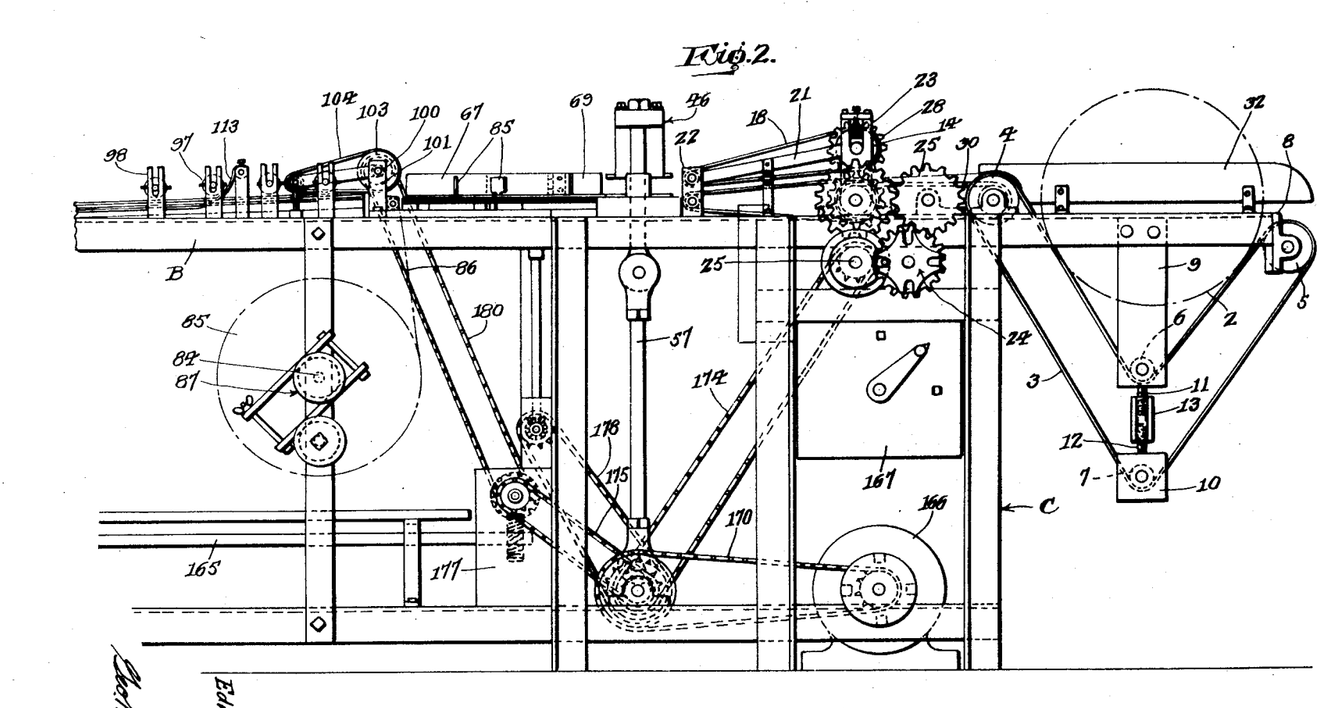
Figure 4:
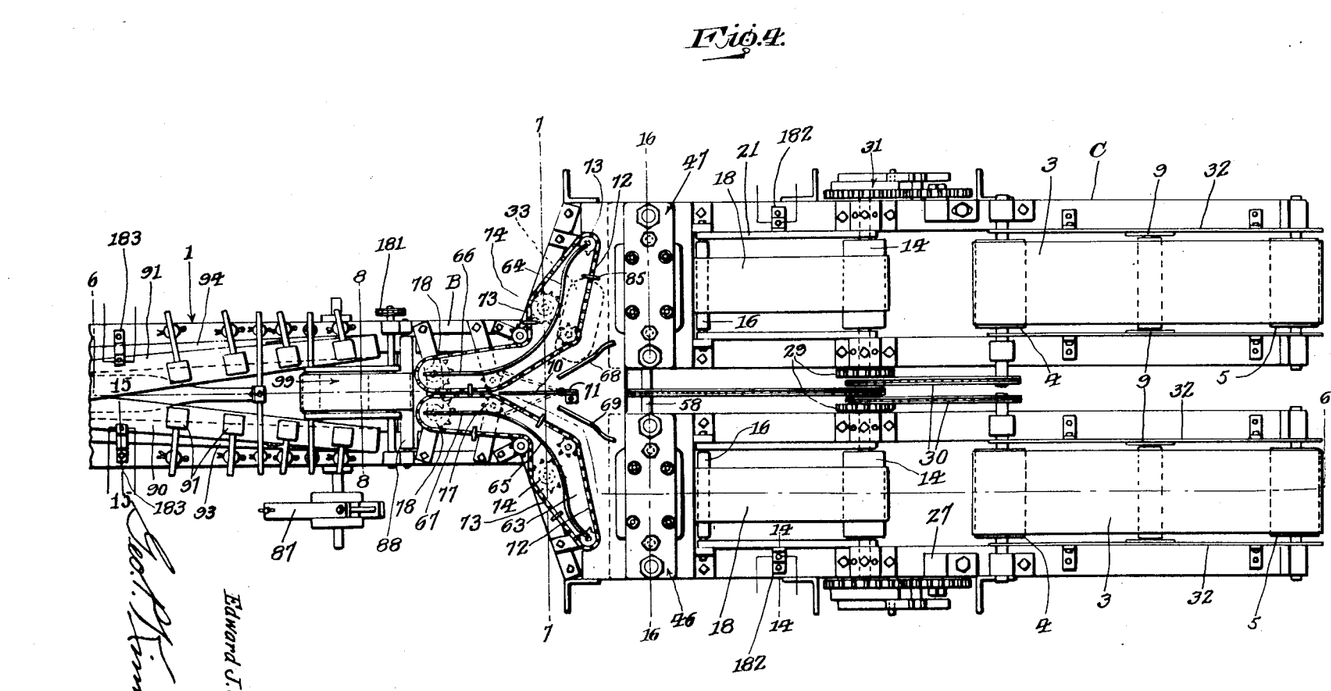
Figure 5:
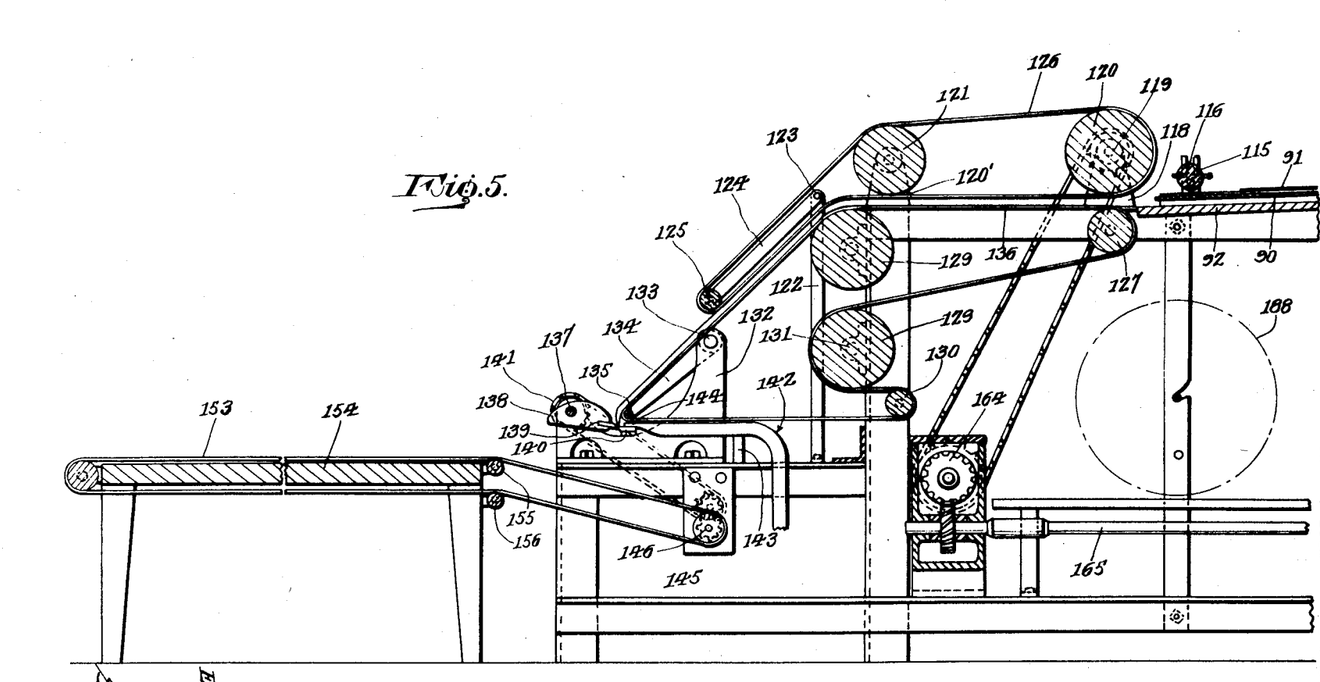
Figure 5 is a section on line 5—5 Figure 3.

With reference to Figures 2 and 4, there is positioned within the frame part C a pair of endwise, opposed, spaced rolls 2 of absorbent material of web-like form. Each roll is supported by an endless belt 3 travelling over upper rollers 4, 5 and lower rollers 6, 7. Roller 4 is supported transversely of the top of frame part C, roller 5 is journaled in spaced brackets 8 secured to the rear end of frame part C, roller 6 is journaled in the lower end of hangers 9 depending from frame part C and roller 7 is journaled in a pair of suspended bearings 10. The hangers 9 have depending therefrom threaded bars 11. The bearings 10 have extending upwardly therefrom threaded bars 12. The bars 11 are arranged in alignment with the bars 12. Threadedly engaging with each pair of aligning bars is an interiorly threaded sleeve 13 for adjusting a bearing relative to a hanger to tension belt 3 when desired. The rollers 6, 7 are arranged in superposed relation and between rollers 4, 5. The arrangement of the rollers provides for the belt 3 to be of V-form. Associated with each roll 2 is an unwinding means for the web thereof and which will now be referred to.

Supported from the top of frame part C, forwardly of roller 4 is a pair of superposed, spaced rollers 14, 15 and supported from the top of frame part C forwardly of the rollers 14, 15 is a pair of superposed spaced rollers 16, 17 of less diameter than the rollers 14, 15. The roller 14 coacts with roller 16 for supporting an endless belt 18. The roller 15 coacts with roller 17 for supporting an endless belt 19. The belts 18, 19 are arranged in superposed spaced relation and the opposed stretches of such belts extend at a downward inclination from rollers 15, 16. The web which is drawn from either roll 2 is indicated at 20. The shaft of the roller 14 is carried by a pair of arms 21 and the latter have their forward ends connected to brackets 22 and carry the rolls 16, 17. The shaft of roller 14 is mounted in cushioning bearings 23 therefor. The roller 15 is driven by means of an intermittent gearing indicated generally at 24 which is operatively connected with a shaft 25 extending transversely of the frame part C. The gearing 24 includes an idler gear 26 so mounted in a bracket 27 adjustable lengthwise of the frame part C in order that gear 26 may have a similar gear substituted therefor when more or fewer teeth are desired. The shaft of roller 14 is rotated by means of a gear 28 meshing with a gear 29 carried by the shaft of the roller 15. The roller 4 is operated by means of a chain 30 driven from a sprocket on the shaft of roller 14. The foregoing assembly of belts, rollers and gears is located at one side of the frame part C. The duplicate assembly includes an intermittent gearing 31 similar to the gearing 24 and also driven from shaft 25. The gearings 24 and 31 are so arranged with respect to each other and to shaft 25 that the webs 20 at the opposite sides of the frame part C will be fed alternately. The rolls 2 are maintained in position on their respective belts by means of elongated guides 32 adjacent each end of each roll 2.

With reference to Figures 2, 4 and 16 to 19 there is disposed within the path of each web 20 and arranged on frame part C a cutter mechanism preferably of the type described and claimed in my application filed September 28, 1931, Serial No. 563,609. The cutter mechanisms are indicated generally by the numerals 46 and 47 and are arranged in alignment transversely of the machine. Each cutter mechanism includes a stationary plate 48 formed with a substantially I-shaped slot 49. Carried by the plates 48 are a pair of spaced die plates 50 which are of less length than the slot 49. The opposing edges of the plates 50 are formed with rounded corners 51 to conform with the contour of the slot 49, and the plates are arranged with their opposing edges flush with the edge faces of the slot. Slidably extending through the plate 48, at opposite ends of the slot 49 are a pair of rods 52 having a plate 53 connected to the upper ends thereof. Depending from the plate 53 is a cutter blade 54 which is shaped to snugly pass through the slot 49 between and at the sides of the plate 50. The blade 54 has a cutting edge 55 which inclines upwardly from the ends thereof toward the center thereof and corresponds in length to the die plates 50. The rods 52 of each of the cutter mechanisms 46 and 47 are connected at their lower ends by means of rods 56. The rods 56 are pivotally connected with connecting rods 57 which are driven from a crank shaft 58 extending transversely of the frame. The connecting rods of the cutter mechanisms are connected with the crank shaft 58 in a manner to operate the cutter mechanisms alternately.

The web 20 is discharged from between the belts 18 and 19 onto the die plates 50. While the material is seated on the die plates 50, the blade 54 is lowered through the slot 49 whereby an end portion of the web 20 is cut off, with such portion, as well as the forward end of the web having rounded corners. The blade 54 is then raised while the material is again advanced over the die plates 50, after which the blade 54 is again lowered through the slot 49 to cut off another end portion of the web 20. Thus it will be seen that successive downward movement of the blade 54 forms the front and rear edge respectively of a pad 33 having rounded corners as indicated at 59. Prior to the contact of the blade 54 with the web 20, the latter is firmly held in position by means of a pair of presser plates 60 located on opposite sides of the blade 54. Each of the plates 60 is secured to the lower end of a pair of rods 61 slidably extending through the plate 53 and provided at their upper ends with stop nuts 62. When the plate 53 is in its raised position the presser plates 60 depend below the cutting edge of the blade 54 in order that the plates 60 will be lowered into contact with the web 20 before the latter is engaged by the blade 54. When the plate 53 is moved to its raised position, the plates 60 remain stationary until the plate 53 engages the stop nuts 62 in order to prevent the pads 33 from sticking to the blade 54.

With reference to Figures 2, 4, 6 and 7, there is disposed forwardly of the cutter mechanisms and arranged upon the top of frame part C and extended upon frame part B a substantially Y-shaped tray 63 for receiving the pads 33 from the cutter mechanisms. The tray is provided with a pair of oppositely disposed, upstanding curved ribs 64, 65 having forwardly directed inner end portions 66, 67 respectively arranged in parallel spaced relation with a forward pad passage. The ribs constitute pad guides. Arranged on tray 63 and associated with the remaining portion of the ribs 64, 65 are upstanding, oppositely disposed, inclined deflectors 68, 69 respectively which are positioned rearwardly of ribs 64, 65. The deflectors 68, 69 incline towards each other from rear to front. The deflector 68 associates with rib 64 to provide a rear passage for the pad delivered from cutter mechanism 47. The deflector 69 associates with rib 65 to provide a rear passage for the pad delivered from cutter mechanism 48. The rear pad passages open into the forward pad passage. Positioned on the tray 63, centrally thereof and having its rear end arranged between and centrally with respect to the deflectors 68, 69 is a forwardly extending, resilient, horizontally shiftable wall forming member 70 of a length to have its forward end arranged between the portions 66, 67 of the ribs 64, 65. The member 70 is shifted in one direction by the pad from the cutter mechanism 46 and in the other direction by the pad from the cutter mechanism 47. The rear end of member 70 is secured to a holder 71 and is common to the portions 66, 67 of the ribs 64, 65 and also to the deflectors 68, 69 and alternately functions with a deflector to provide a continuation of the inner wall of one passage for the pads from a cutter mechanism and to close the other passage for the pads from the other cutter mechanism. The resiliency of the member 70 is such that it will not retard the travel of the pads to the space formed between the portions 66, 67 of the ribs 64, 65. The tray 63 is formed with a pair of oppositely disposed slots 72 within the pad passages, and arranged below each slot is an endless chain 73. Each chain passes around a drive sprocket 74 and a plurality of idler sprockets 75, 76, 77, 78 and 79. The drive sprockets are mounted on the upper ends of shafts 80, the lower ends of which are provided with bevel gears 81 meshing with bevel gears 82 mounted on a shaft 83 extending transversely of frame part C. Each chain 73 is provided with a set of upstanding spaced stems 84 each carrying a pusher 85. The pads 33 are engaged by the pushers during the travel of the chains 73 and are moved through the pad passages to position them in spaced relation upon and to be covered by a web of gauze, after which the latter is severed in desired lengths and with each length enveloping and extending from the ends of a pad to complete the napkin.

Figure 6:
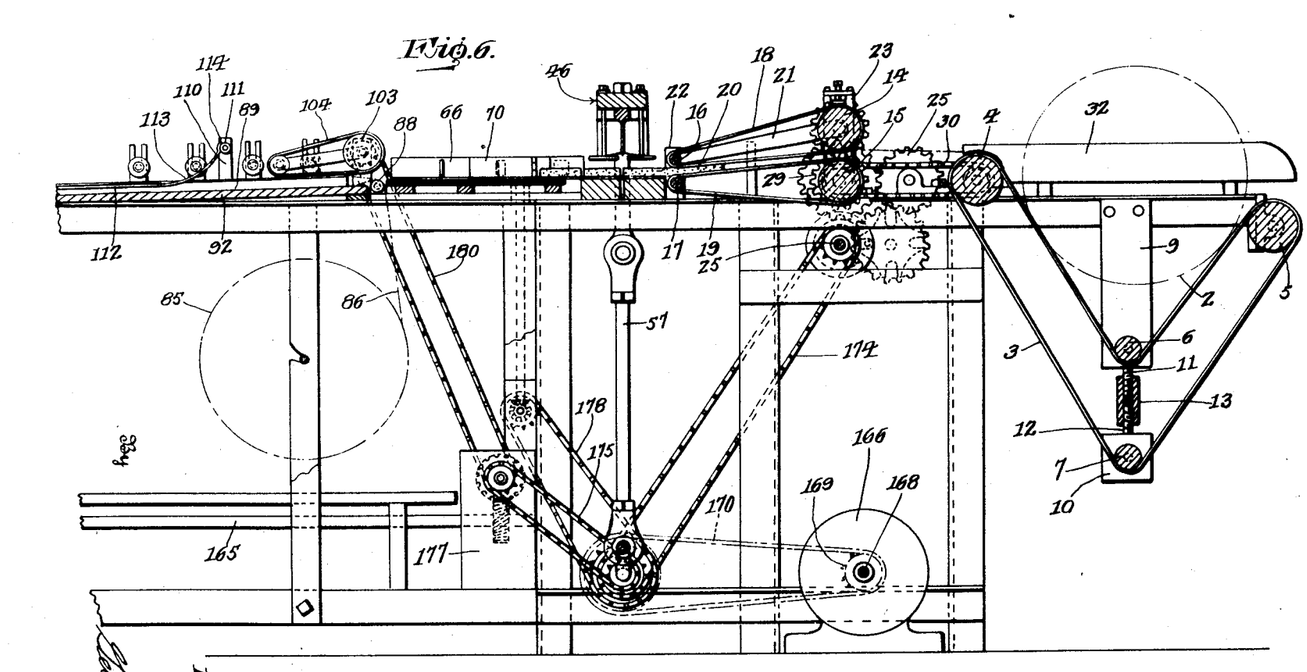
Figure 6 is a section on line 6—6 Figure 4.

With reference to Figures 2, 4 and 6 there is journaled in, transversely of, below the top and in proximity to the rear end of frame part B a spindle 84 which carries a roll 85 of gauze and the web which winds off the roll 85 is indicated at 86. The gauze provides a covering for the pads, and a length of the web 86 in connection with a pad provides the napkin. The pad is of less length than that of the gauze which encloses it. The roll 85 is arranged below the top of frame part B. One end of the spindle 84 has associated therewith a tensioning device 87 which serves as a brake and prevents slack in the web 86 as it unwinds from roll 85.

Journaled upon the top of frame part B, above roll 85, and rearwardly of spindle 84 is a transversely disposed roll 88, constituting a guide for and over which passes the web 86. On the operation of the machine, the web 86 passes forwardly upon a track 89 and upon a pair of flat elongated, oppositely disposed blades providing folders 90, 91 for the side marginal portions of the web 86. The folders 90, 91 extend towards each other at opposite inclination. The folder 90 is of greater length than that of and is arranged at a lower level than folder 91. The forward end of folder 90 overlaps the folder 91. The folders gradually increase in width from rear to front. The outer side edge of each folder is straight and its inner side edge inclined throughout.

The track 89 is provided by a rectangular plate or board 92 which inclines downwardly from rear to front, is secured to the top of and spaced from each side of frame part B. Mounted upon and disposed lengthwise of the board 92 is a pair of elongated supporting members 93, 94 for the folders 90, 91 respectively. The members 93, 94 extend at an inclination towards each other from rear to front. The member 93 corresponds in length to folder 90 and member 74 is of greater length than folder 91. The folders project inwardly from the inner side edges of the members 93, 94, extend at a greater inclination than that of the latter and are hinged, as at 95 to such members. The folders are elevated above and held in elevated position with respect to members 93, 94 by combined adjusting and holding screws 96. The member 94 is of greater height throughout than that of member 93. The board 92 extends forwardly from the forward ends of members 93, 94 and folder 96.

Figure 8:
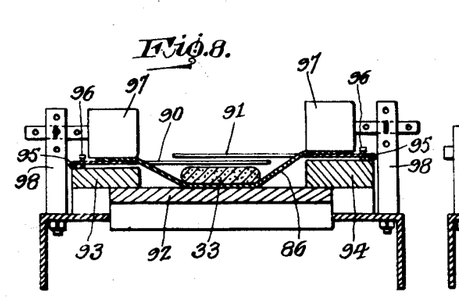
Figure 8 is a section on line 8—8 Figure 4.
Figure 9:
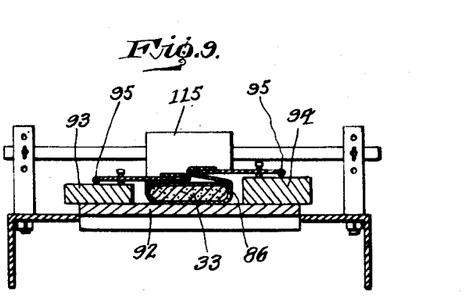
Figure 9 is a section on line 9—9 Figure 3.

The construction and arrangement of the folders with respect to the track 89 will provide for the web 86 to assume the positions shown in Figures 8 and 9. Spaced, opposed sets of spaced vertically and horizontally adjustable holding down rollers 97 are provided for the side marginal portions of the web 86. One set is suspended over folder 90 and the other over folder 91.

Figure 10:
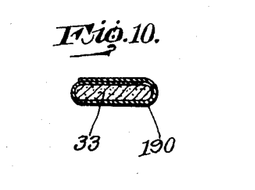
Figure 10 is a cross sectional view of the completed article.

The suspending means for roller 97 is indicated at 98 and is secured upon the sides of the frame part B. The folders act to provide for positioning the side marginal portions of the web 82 in overlapped relation with respect to the pads 33 as shown in Figure 10.

Figures 3, 12, 13, 14, 15:
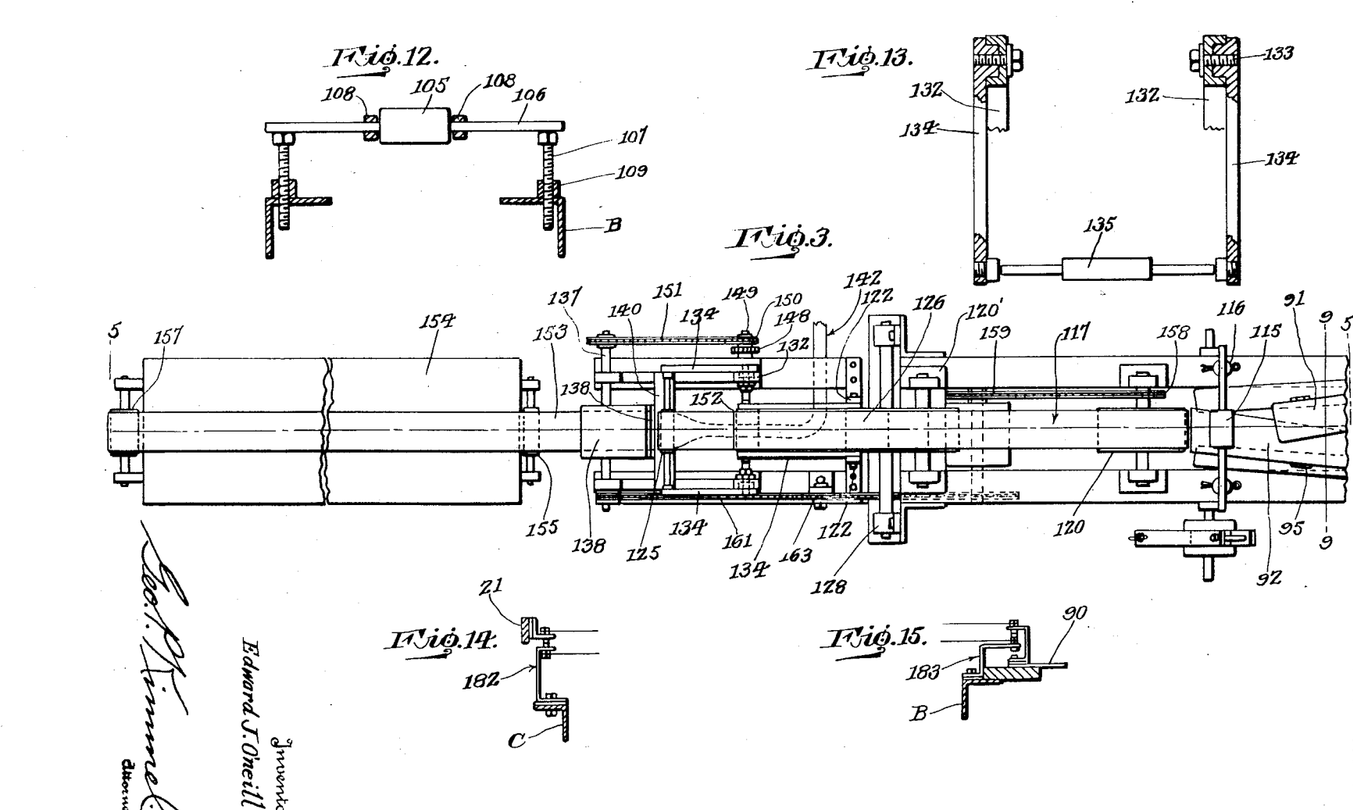
Figures 3 and 4 when taken together illustrate the machine in top plan.
Figure 12 is a sectional detail view of the adjustable combined holder and director for the pad.
Figure 13 is a sectional detail illustrating the means for positioning the covered pads to be cut into napkins.
Figure 14 is a section on line 14—14 Figure 4.
Figure 15 is a section on line 15—15 Figure 4.

Arranged between the rear end of the folders and over the board 92 is an adjustable combined pad holder and director element 99 for the pad 33 as it enters upon the web 86 to be enclosed by the latter. The element 99 includes a shaft 100 carried by a pair of uprights 101 secured to the sides of the top of frame part 102. Fixed to shaft 100 is a roller 103 over which travels an endless belt 104, the latter also passes around a roll 105 which is arranged forwardly of and is of less diameter than roll 103. Roll 105 is carried by a shaft 106 which is seated upon the top of a pair of vertically adjustable supports 107 secured to the sides of frame part B. The shaft 106 is connected to shaft 100 by a pair of bars 108 whereby element 99 can be bodily raised upon shaft 100. The element 99 also functions to quickly relieve any congestion that may arise when pad 33 is positioned upon web 86, because if the pad becomes jammed at such point, the elevating of element 99 can enable the attendant to remove the pad or overcome the congestion. The supports 107 are locked in adjusted position by the holding nuts 109.

Arranged forwardly of and in close proximity to the supports 107, is a pair of vertical supports 110 which are secured to the top of frame part B, and to the upper ends of which is attached a transversely extending rod 111. Extending forwardly of the latter is a metallic blade 112 which seats upon the top of the pads 33 which are positioned upon the web 86. The blade 112 has an upstanding curved reduced rear end part 113 which is secured to the center of rod 111, as at 114. That portion of blade 112 which seats upon the pads 33 is of the same width, as that of the latter, and prevents, when the marginal portions of web 86 are folded in overlapping relation with respect to the pad the distorting of the sides or the bunching of the pad body, whereby during the folding operation the pad will remain uniform. See Figure 9. The blade 112 extends in proximity to a guide roll 115 arranged over the top of frame part B and mounted in supports 116. The roller 115 is arranged over the forward end of folder 90.

Positioned at the forward end of the board 92 is a feed mechanism 117 for the purpose of positioning the folded web 86 to be severed into lengths with a pad 33 enveloped by each of the severed lengths of the web 86. The severed lengths are uniform and are so cut that each will extend from each end of the pad and thereby provide the napkin. The mechanism 117 is arranged upon frame parts A and B and comprises a pair of upstanding supports 118 on frame part B. Journaled in the supports 118 is a shaft 119 carrying a roll 120. Forwardly of the supports 118 is arranged a pair of supports 120' having journaled therein a roll 121 of less diameter than and opposing roll 120. Fixed to the frame part A directly in front of the forward end of frame part B is a pair of rigid upstanding rods 122 extending upwardly to a height greater than that of the top of frame part B. Secured at their upper ends as at 123 to the upper ends of the rods 122 is a pair of depending forwardly inclined arms 124 having journaled with the lower ends a roll 125. The roll 125 is of materially less diameter than that of rolls 120 and 121. Travelling around the top, bottom and rear of roll 120, against the top and bottom of roll 121 and around the front, top and bottom of roll 125 and in a direction towards roll 120 is an endless confining and conveying belt 126 for the folded web 86.

Arranged below the roll 120 and supported by frame part B is a roll 127. Supported in bearings 128 at the front of frame part B is a pair of superposed spaced rolls 129, 129'. Supported by frame part B below and rearwardly of roll 129' is a roll 130 of less diameter than that of rolls 177, 129 and 129'. Roll 177 is of less diameter than rolls 129, 129'. The shaft of roll 129' is indicated at 131. Secured upon the top of frame part A is a pair of upstanding opposed brackets 132 to which the upper ends of a pair of downwardly extending, forwardly inclined arms 134 are attached as at 133. The lower ends of arms 134 have journaled therewith a roll 135. Travelling around the rear, top and bottom of roll 127 over the top of roll 129, around roll 135, around roll 130, against the bottom, around the front and against the top of roll 129' and in a direction towards roll 127 is an endless feed belt 136, the latter being arranged relative to belt 126 whereby the bottom stretch of the latter will be positioned in spaced relation with respect to a part of the top stretch of the former. The forward part of the lower stretch of belt 126 is disposed at a downward inclination. The forward part of the upper stretch of belt 136 is also disposed at a downward inclination, but such inclined part is of a greater length than and extends forwardly from the inclined part of belt 126. The roll 125 is arranged above and spaced rearwardly of the roll 135 and its diameter is greater than that of the latter. The stretches coact to feed the folded web 86 in a direction towards a web cutter mechanism to be presently referred to and the lower stretch of belt 136 functions to present folded web 86 to such cutter mechanism for severance.

Supported by the brackets 132 is a cutter mechanism for severing the folded web 86 into lengths, and which includes a shaft 137 provided with a head member 138 carrying the revoluble cutter 139 of the mechanism, which associates with the stationary cutter 140 positioned below roll 135. The shaft 137 carries a sprocket pinion 141.

To prevent the severed ends of the web 86 from sticking to the cutters a blower device 142 is employed and which is arranged between brackets 132, supported from frame part A, as at 143 and is adapted to be connected to a suitable source of air supply. The mouth 144 of the device 142 is positioned between cutter 140 and roll 135.

Supported in hangers 145 depending from the top of frame part A is a shaft 146 carrying a pinion 147, which meshes with a pinion 148, mounted on stub shaft 149 fixed to one of the hangers 145 above shaft 146. Shaft 149 carries a revoluble unit comprising a sprocket 150 and the pinion 148. Driven from the sprocket 141, on shaft 137 is an endless chain 151, which engages with the sprocket 150 for operating the unit on shaft 149 thereby providing for the driving of shaft 146, the latter being provided with a fixed roll 152 for operating a conveyor belt 153, upon which the severel lengths of the web 86 are deposited for conveying them to a table 154, whereby an attendant can remove the napkin and fold the ends thereof in the desired manner. The table 154 is arranged forwardly of frame part A, and its rear has attached thereto a pair of superposed spaced rolls 155, 156. Upon the roll 155 travels the upper stretch of the belt 153 and against the roll 156 travels the lower stretch of the belt 153. The forward end of table 154 has supported therefrom a roll 157 around which travels the belt 153. The upper stretch of the latter is arranged over the top of table 154 and the lower stretch below the latter.

The shaft 119 of roll 120, is provided with a sprocket 158 which is engaged and driven by an endless chain 159. The shaft 128 of roll 129' is provided with a sprocket 160 which is engaged and driven by an endless chain 161, the latter is also employed for engaging and operating a sprocket 162 carried by the shaft 137 of the cutter mechanism. The chain 161 also travels over a vertically adjustable sprocket device 163 which is arranged below sprockets 160 and 162, and is supported from frame part A. The device 162 also provides a tensioning means for chain 161. The chains 159 and 160 are operated by a common driving means 164 driven from a transmission shaft 165 supported within the machine frame at the lower portion of the latter.

The moving parts of the machine are operated from an electric motor 166 connected with a control box 167. The shaft 168 of the motor is provided with a sprocket 169, which is connected by means of a chain 170 with a sprocket 171 on the crank shaft 58, and the latter centrally thereof is provided with a pair of opposed spaced sprockets 172, 173 the former operating chain 174 for driving shaft 25. A chain 175 is driven from sprocket 173 for operating a boxed gear mechanism 177. The shaft 58 is also provided with a sprocket 177' which operates a chain 178 for driving a sprocket 179 on shaft 83. The gear mechanism 177 is employed for operating a chain 180 which leads therefrom to a sprocket 181 on shaft 100 for the purpose of driving the latter. The gear mechanism 176 also drives transmission shaft 165 employed for operating the driving mechanism or boxed gear mechanism 164.

A pair of normally closed switches 182 is employed for opening the motor circuit on the event of the pads 33 clogging, bunching or lumping between the opposed stretches of the belts 18, 19. See Figure 14. Each switch includes two contacts, one carried by the frame part C and the other by an arm 21 of a pair. When the pair of arms 21 is elevated, the contacts are separated thereby opening the motor circuit thereby stopping the operation of the machine.

A pair of normally closed switches 183 is employed for opening the motor circuit in the event of the web 86 clogging, bunching or lumping with respect to the folders. See Figure 15. Each switch includes two contacts, one carried by frame part B and the other by a folder. When a folder is elevated on its hinge by the clogged or bunched web 86, the pair of contacts are separated and the motor circuit closed, thereby stopping the operation of the machine.

The switches 182 and 183 are connected with the source of power for the motor through the control box 167.

In order to reduce to a minimum the length of time which is necessary to stop the machine upon the exhausting of the roll of gauze 85, a similar roll 188 is mounted on frame part B forwardly of roll 85. Upon using all of the web 86 from roll 85, it is merely necessary to thread the web from roll 188 over the roller 88 in the same manner as shown with respect to web 86.

Figure 11:
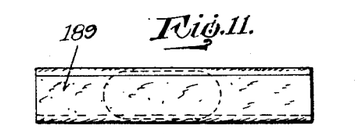
Figure 11 is a plan view of the completed article.
Figure 16:
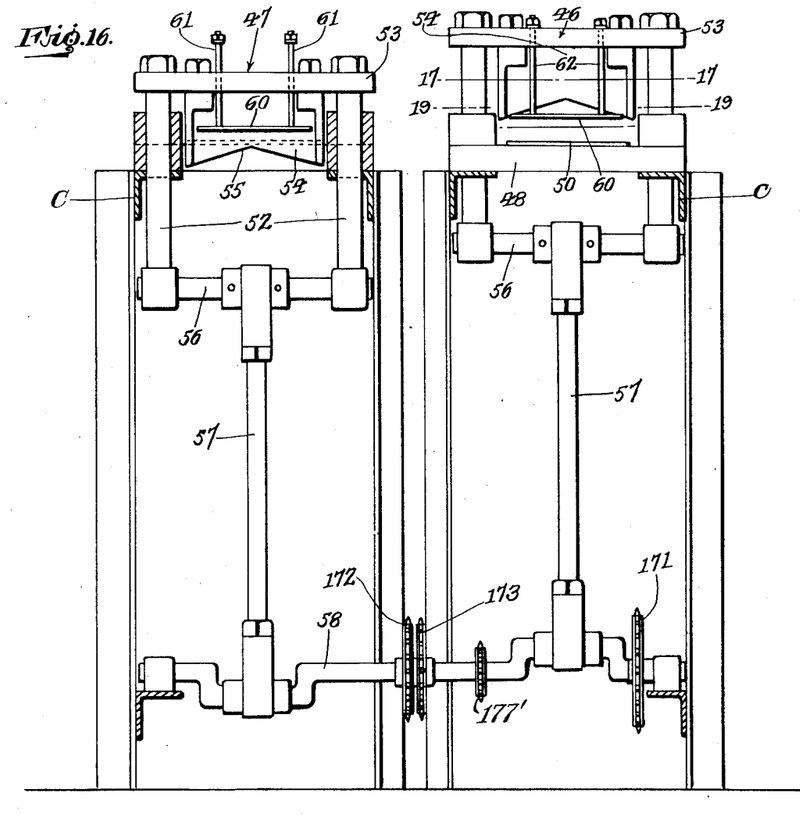
Figure 16 is a section on line 16—16 Figure 4.
Figure 17:
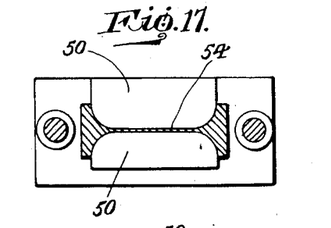
Figure 17 is a section on line 17—17 Figure 16.
Figure 18:
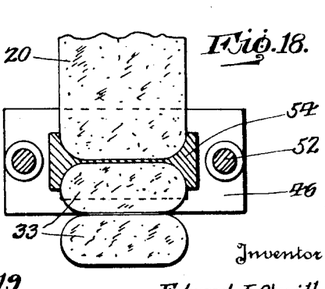
Figure 18 is a view similar to Figure 17 showing goods with respect to the cutter.
Figure 19:
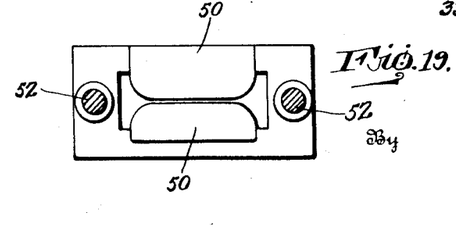
Figure 19 is a section on line 19—19 Figure 16.

In the operation of the machine, the web of gauze is moved continuously upon the folders and track 89. The cutter mechanisms 46 and 47 operate alternately to discharge the pads 33 upon the tray 63. The web 20 is continuously moved towards the cutter mechanisms 46 and 47. A napkin as produced by the machine is shown by Figure 11 and indicated at 189. The length of the web 86 which envelopes a pad 33 is indicated at 190 Figure 10.

The cutter mechanism for the web 86 is so timed with respect to the travel of the latter that the web 86 will be cut in a manner that the leading portion of length 190 with respect to pad 33 will be of the same area as the following portion of the length with respect to the pad.

What I claim is:—

1. In a machine for making sanitary napkins, a pair of oppositely inclined, flat, horizontally disposed, elongated blades extending towards each other from rear to front and forming folders for the side marginal portions of a continuously moving web to envelope a pad carried thereby, supports for maintaining the folders at different levels, means for hingedly connecting the folders to said supports, and adjustable means carried by the folders for elevating them on their hinged connections.

2. In a machine for making sanitary napkins, a pair of oppositely inclined, flat, horizontally disposed, elongated blades extending towards each other from rear to front and forming folders for the side marginal portions of a continuously moving web to envelope a pad carried thereby, supports for maintaining the folders at different levels, means for hingedly connecting the folders to said supports, adjustable means carried by the folders for elevating them on their hinged connections, and a blade positioned below the folders for seating on the pad to prevent the distorting of the sides and bunching of the latter during the enveloping of the pad by the web.

3. In a machine for making sanitary napkins, a pair of horizontally disposed, elongated blades extending towards each other from rear to front, arranged at different levels and forming folders for the side marginal portions of a continuously moving web to encompass a pad carried thereby, and a blade positioned below said folders for seating on the pad to prevent the distorting of the sides and bunching of the latter during the encompassing of the pad by the marginal portions of the web.

4. In a machine for making sanitary napkins, a pair of horizontally disposed, elongated blades extending towards each other from rear to front, arranged at different levels and forming folders for the side marginal portions of a continuously moving web to encompass a pad carried thereby, a blade positioned below said folders for seating on the pad to prevent the distorting of the sides and bunching of the latter during the encompassing of the pad by the marginal portions of the web, a cutter mechanism for severing the web with respect to the ends of the pad to provide for the portions of the web extending from the ends of the latter to be of uniform length, and a feeder mechanism for conducting the folded web to said cutter mechanism.

5. In a machine for making sanitary napkins, a pair of horizontally disposed, elongated blades extending towards each other from rear to front, arranged at different levels and forming folders for the side marginal portions of a continuously moving web to encompass a pad carried thereby, a blade positioned below said folders for seating on the pad to prevent the distorting of the sides and bunching of the latter during the encompassing of the pad by the marginal portions of the web, a cutter mechanism for severing the folded web adjacent the ends of the pad to form the napkin, a feeder mechanism for conducting the folded web to the cutter mechanism, and a travelling endless conveyor arranged below said cutter mechanism to receive and for conducting the napkin forwardly of the cutter mechanism.

6. In a machine for making sanitary napkins, a pair of horizontally disposed, elongated blades extending towards each other from rear to front, arranged at different levels and forming folders for the side marginal portions of a continuously moving web to encompass a pad carried thereby, a blade positioned below said folders for seating on the pad to prevent the distorting of the sides and bunching of the latter during the encompassing of the pad by the marginal portions of the web, a cutter mechanism for severing the folded web adjacent the ends of the pad to form the napkin, a feeder mechanism for conducting the folded web to the cutter mechanism, a travelling endless conveyor arranged below said cutter mechanism to receive and for conducting the napkin forwardly of the cutter mechanism, and a table arranged forwardly of said cutter mechanism and over which travels the upper stretch of said conveyor.

7. In a machine for making sanitary napkins, a pair of horizontally disposed, elongated blades extending towards each other from rear to front, arranged at different levels and forming folders for the side marginal portions of a continuously moving web to encompass a pad carried thereby, a blade positioned below said folders for seating on the pad to prevent the distorting of the sides and bunching of the latter during the encompassing of the pad by the marginal portions of the web, a cutter mechanism for severing the folded web adjacent the ends of the pad to form the napkin, a feeder mechanism for conducting the folded web to the cutter mechanism, a travelling endless conveyor arranged below said cutter mechanism to receive and for conducting the napkin forwardly of the cutter mechanism, a table arranged forwardly of said cutter mechanism and over which travels the upper stretch of said conveyor, and said table provided at the front and rear thereof with rolls for the upper and lower stretches of said conveyor.

8. In a machine for making sanitary napkins, a pair of horizontally disposed, elongated blades extending towards each other from rear to front, arranged at different levels and forming folders for the side marginal portions of a continuously moving web to encompass a pad carried thereby, a blade positioned below said folders for seating on the pad to prevent the distorting of the sides and bunching of the latter during the encompassing of the pad by the marginal portions of the web, and a blower device arranged below said feeder mechanism to prevent the ends, at the point of severance of the web from sticking to said cutter mechanism.

9. In a machine for making sanitary napkins, a pair of horizontally disposed, elongated blades extending towards each other from rear to front, arranged at different levels and forming folders for the side marginal portions of a continuously moving web to encompass a pad carried thereby, a blade positioned below said folders for seating on the pad to prevent the distorting of the sides and bunching of the latter during the encompassing of the pad by the marginal portions of the web, a cutter mechanism for severing the web with respect to the ends of the pad to provide for the portions of the web extending from the ends of the latter to be of uniform length, a feeder mechanism for conducting the folded web to said cutter mechanism, and a blower device arranged below said feeder mechanism to prevent the ends at the point of severance of the web from sticking to said cutter mechanism.

10. In a machine for making sanitary napkins, a pair of horizontally disposed, elongated blades extending towards each other from rear to front, arranged at different levels and forming folders for the side marginal portions of a continuously moving web to encompass a pad carried thereby, a blade positioned below said folders for seating on the pad to prevent the distorting of the sides and bunching of the latter during the encompassing of the pad by the marginal portions of the web, a cutter mechanism for severing the folded web adjacent the ends of the pad to form the napkin, a feeder mechanism for conducting the folded web to the cutter mechanism, a travelling endless conveyor arranged below said cutter mechanism to receive and for conducting the napkin forwardly of the cutter mechanism, and a blower device arranged below said feeder mechanism to prevent the ends at the point of severance of the web from sticking to said cutter mechanism.

11. In a machine for making sanitary napkins, a pair of horizontally disposed, elongated blades extending towards each other from rear to front, arranged at different levels and forming folders for the side marginal portions of a continuously moving web to encompass a pad carried thereby, a blade positioned below said folders for seating on the pad to prevent the distorting of the sides and bunching of the latter during the encompassing of the pad by the marginal portions of the web, a cutter mechanism for severing the folded web adjacent the ends of the pad to form the napkin, a feeder mechanism for conducting the folded web to the cutter mechanism, a travelling endless conveyor arranged below said cutter mechanism to receive and for conducting the napkin forwardly of the cutter mechanism, a table arranged forwardly of said cutter mechanism and over which travels the upper stretch of said conveyor, and a blower device arranged below said feeder mechanism to prevent the ends at the point of severance of the web from sticking to said cutter mechanism.

12. In a machine for making sanitary napkins, a frame, a V-shaped travelling endless belt providing a support for a roll of pad forming material of web-like form, a front, a rear, and a pair of superposed spaced lower rolls for said belt, said lower rolls arranged between said front and rear rolls, means for driving said upper roll, opposed stretches of said belt travelling against the lower faces of said lower rolls, and an adjustable tensioning means for the belt connected with said lower rolls and providing a suspension for the lowermost lower roll.

13. In a machine for making sanitary napkins, alternately operable cutter mechanisms, means for feeding a pair of spaced absorbent webs to said mechanisms to be successively and alternately cut into pad-like forms, a folder mechanism for folding the marginal portion of a continuously moving web of covering material for enveloping the pads, means arranged forwardly of said cutter mechanisms for alternately conducting the pads from the latter to the rear of the folder mechanism and including a forward pad passage and a pair of rear pad passages opening into said forward passage and a shiftable wall forming means normally closing the rear passages to each other and shiftable by a pad on its travel through one of the rear passages for closing the other rear passage to said forward passage, means for positioning the pads in spaced relation upon the rear end of the folder mechanism upon and to be enveloped by the web of covering material, and means for severing the folded web at spaced distances from the ends of the pads enveloped thereby to provide the napkins.

14. In a machine for making sanitary napkins, alternately operable cutter mechanisms, means for feeding a pair of spaced absorbent webs to said mechanisms to be successively and alternately cut into pad-like forms, a folder mechanism for folding the marginal portion of a continuously moving web of covering material for enveloping the pads, means arranged forwardly of said cutter mechanisms for alternately conducting the pads from the latter to the rear of the folder mechanism and including a forward pad passage and a pair of rear pad passages opening into said forward passage and a shiftable wall forming means normally closing the rear passages to each other and shiftable by a pad on its travel through one of the rear passages for closing the other rear passage to said forward passage, means for positioning the pads in spaced relation upon the rear end of the folder mechanism upon and to be enveloped by the web of covering material, means for severing the folded web at spaced distances from the ends of the pads enveloped thereby to provide the napkins, and means arranged in the folder mechanism and seated upon the pads to prevent the distortion thereof when being enveloped by said web of covering material.

15. In a machine for making sanitary napkins, alternately operable cutter mechanisms, means for feeding a pair of spaced absorbent webs to said mechanisms to be successively and alternately cut into pad-like forms, a folder mechanism for folding the marginal portion of a continuously moving web of covering material for enveloping the pads, means arranged forwardly of said cutter mechanisms for alternately conducting the pads from the latter to the rear of the folder mechanism and including a forward pad passage and a pair of rear pad passages opening into said forward passage and a shiftable wall forming means normally closing the rear passages to each other and shiftable by a pad on its travel through one of the rear passages for closing the other rear passage to said forward passage, means for positioning the pads in spaced relation upon the rear end of the folder mechanism upon and to be enveloped by the web of covering material, means for severing the folded web at spaced distances from the ends of the pads enveloped thereby to provide the napkins, and a blower device acting to prevent the ends, at the points of severance of the folded web from sticking to said cutting means.

16. In a machine for making sanitary napkins, alternately operable cutter mechanisms, means for feeding a pair of spaced absorbent webs to said mechanisms to be successively and alternately cut into pad-like forms, a folder mechanism for folding the marginal portion of a continuously moving web of covering material for enveloping the pads, means arranged forwardly of said cutter mechanisms for alternately conducting the pads from the latter to the rear of the folder mechanism and including a forward pad passage and a pair of rear pad passages opening into said forward passage and a shiftable wall forming means normally closing the rear passages to each other and shiftable by a pad on its travel through one of the rear passages for closing the other rear passage to said forward passage, means for positioning the pads in spaced relation upon the rear end of the folder mechanism upon and to be enveloped by the web of covering material, means for severing the folded web at spaced distances from the ends of the pads enveloped thereby to provide the napkins, means arranged in the folder mechanism and seated upon the pads to prevent the distortion thereof when being enveloped by said web of covering material, and a blower device acting to prevent the ends, at the points of severance of the folded web from sticking to said cutting means.

17. In a machine for making sanitary napkins, alternately operable cutter mechanisms, means for feeding a pair of spaced absorbent webs to said mechanisms to be successively and alternately cut into pad-like forms, a folder mechanism for folding the marginal portion of a continuously moving web of covering material for enveloping the pads, means arranged forwardly of said cutter mechanisms for alternately conducting the pads from the latter to the rear of the folder mechanism and including a forward pad passage and a pair of rear pad passages opening into said forward passage and a shiftable wall forming means normally closing the rear passages to each other and shiftable by a pad on its travel through one of the rear passages for closing the other rear passage to said forward passage, means for positioning the pads in spaced relation upon the rear end of the folder mechanism upon and to be enveloped by the web of covering material, means for severing the folded web at spaced distances from the ends of the pads enveloped thereby to provide the napkins, and a travelling endless conveyor arranged below said cutting means to receive and for conducting the napkins forwardly of said cuttings means.

18. In a machine for making sanitary napkins, alternately operable cutter mechanisms, means for feeding a pair of spaced absorbent webs to said mechanisms to be successively and alternately cut into pad-like forms, a folder mechanism for folding the marginal portion of a continuously moving web of covering material for enveloping the pads, means arranged forwardly of said cutter mechanisms for alternately conducting the pads from the latter to the rear of the folder mechanism and including a forward pad passage and a pair of rear pad passages opening into said forward passage and a shiftable wall forming means normally closing the rear passages to each other and shiftable by a pad on its travel through one of the rear passages for closing the other rear passage to said forward passage, means for positioning the pads in spaced relation upon the rear end of the folder mechanism upon and to be enveloped by the web of covering material, means for severing the folded web at spaced distances from the ends of the pads enveloped thereby to provide the napkins, means arranged in the folder mechanism and seated upon the pads to prevent the distortion thereof when being enveloped by said web of covering material, and a travelling endless conveyor arranged below said cutting means to receive and for conducting the napkins forwardly of said cutting means.

19. In a machine for making sanitary napkins, alternately operable cutter mechanisms, means for feeding a pair of spaced absorbent webs to said mechanisms to be successively and alternately cut into pad-like forms, a folder mechanism for folding the marginal portion of a continuously moving web of covering material for enveloping the pads, means arranged forwardly of said cutter mechanisms for alternately conducting the pads from the latter to the rear of the folder mechanism and including a forward pad passage and a pair of rear pad passages opening into said forward passage and a shiftable wall forming means normally closing the rear passages to each other and shiftable by a pad on its travel through one of the rear passages for closing the other rear passage to said forward passage, means for positioning the pads in spaced relation upon the rear end of the folder mechanism upon and to be enveloped by the web of covering material, means for severing the folded web at spaced distances from the ends of the pads enveloped thereby to provide the napkins, a blower device acting to prevent the ends, at the points of severance of the folded web from sticking to said cutting means, and a travelling endless conveyor arranged below said cutting means to receive and for conducting the napkins forwardly of said cutting means.

20. In a machine for making sanitary napkins, alternately operable cutter mechanisms, means for feeding a pair of spaced absorbent webs to said mechanisms to be successively and alternately cut into pad-like forms, a folder mechanism for folding the marginal portion of a continuously moving web of covering material for enveloping the pads, means arranged forwardly of said cutter mechanism for alternately conducting the pads from the latter to the rear of the folder mechanism and including a forward pad passage and a pair of rear pad passages opening into said forward passage and a shiftable wall forming means normally closing the rear passages to each other and shiftable by a pad on its travel through one of the rear passages for closing the other rear passage to said forward passage, means for positioning the pads in spaced relation upon the rear end of the folder mechanism upon and to be enveloped by the web of covering material, means for severing the folded web at spaced distances from the ends of the pads enveloped thereby to provide the napkins, means arranged in the folder mechanism and seated upon the pads to prevent the distortion thereof when being enveloped by said web of covering material, a blower device acting to prevent the ends, at the points of severance of the folded web from sticking to said cutting means, and a travelling endless conveyor arranged below said cutting means to receive and for conducting the napkins forwardly of said cutting means.

21. In a sanitary napkin producing machine of that type including cutter and folder mechanisms, a pad conducting means for interposition between said cutter and folder mechanisms and including a forward pad passage, a pair of rear pad passages opening into said forward passage and a shiftable wall forming element normally closing the rear passages to each other and shiftable by a pad on its travel through one of the rear passages for closing the other rear passage to said forward passage.

22. In a sanitary napkin producing machine of that type for folding a web of covering material to encompass spaced pads disposed lengthwise of the latter, the combination of a cutter mechanism for severing the folded web between the pads to provide the napkins, a feeder mechanism for conducting the folded web to be acted upon by the cutter mechanism, and a blower device arranged below said feeder mechanism to prevent the ends at the point of severance of the web from sticking to the cutter mechanism.

23. In a sanitary napkin producing machine of that type for folding a web of covering material to encompass spaced pads disposed lengthwise of the web, the combination of means for imparting a lengthwise travel to the web, a pair of adjustable, superposed, hinged elements for folding the side marginal portions of the web in overlapped relation with respect to the top of the pads, and means overlapped by the overlapped portions of the web and seated upon the pads to prevent the distorting of the sides of or the bunching of the pads during the overlapping of the side marginal portions of the web.

24. In a sanitary napkin producing machine of that type for folding a web of covering material to encompass spaced pads disposed lengthwise of the web, the combination of pad forming means, means for imparting a forward lengthwise travel to the web, means for guiding the pads to successively seat in opposed spaced relation upon and lengthwise of said web and including a forward pad passage and a pair of rear pad passages opening into said forward pad passage and a forwardly extending normally inactive resilient wall forming portion fixed at its rear end and shiftable by a pad on the travel of the latter through one of the rear passages for closing the other rear passage to the forward passage and automatically assuming normal position when cleared by a pad, means acting upon the web for folding it in encompassing relation with respect to the pads, a cutter device for severing the folded web between and adjacent to a pair of opposed pads, and means including a pair of forwardly extending downwardly inclined superposed portions for positioning the assembled web and pads to be acted upon by said cutter device, the lower one of said portions extending forwardly from the upper one of said portions to a position directly over and spaced from an element of said cutter device.

25. In a sanitary napkin producing machine of that type for folding a web of covering material to encompass spaced pads disposed lengthwise of the web, the combination of pad forming means, means for imparting a forward lengthwise travel to the web, means for guiding the pads to successively seat in opposed spaced relation upon and lengthwise of said web and including a forward pad passage and a pair of rear pad passages opening into said forward pad passage and a forwardly extending normally inactive resilient wall forming portion fixed at its rear end and shiftable by a pad on the travel of the latter through one of the rear passages for closing the other rear passage to the forward passage and automatically assuming normal position when cleared by a pad, means acting upon the web for folding it in encompassing relation with respect to the pads, a cutter device for severing the folded web between and adjacent to a pair of opposed pads, means including a pair of forwardly extending downwardly inclined superposed portions for positioning the assembled web and pads to be acted upon by said cutter device, the lower one of said portions extending forwardly from the upper one of said portions to a position directly over and spaced from an element of the cutter device, and a blower device arranged below said positioning means to prevent the ends at the point of severance of the web from sticking to said cutter device.

26. In a sanitary napkin producing machine of that type for folding a web of covering material to encompass spaced pads disposed lengthwise of the web, the combination of a cutter mechanism for acting upon the folded web between the pads to form the napkin, means including a pair of forwardly extending downwardly inclined spaced superposed portions directed towards the cutter mechanism for positioning the assembled web and pads in the path of the cutter mechanism, and a blower device arranged relatively to said means and mechanisms and acting to prevent the ends, at the point of severance of the web, from sticking to the cutter mechanism.

27. In a sanitary napkin producing machine of that type for folding a web of covering material to encompass spaced pads disposed lengthwise of the web, the combination of a cutter mechanism for acting upon the folded web between the pads to form the napkin, means including a pair of forwardly extending downwardly inclined spaced superposed portions directed towards the cutter mechanism for positioning the assembled web and pads in the path of the cutter mechanism, a blower device arranged relatively to said means and mechanisms and acting to prevent the ends, at the point of severance of the web, from sticking to the cutter mechanism, and napkin carrying off means arranged directly below said cutter mechanism and adjustable positioning means and extended forwardly from said cutter mechanism.

28. In a sanitary napkin producing machine of that type for folding a web of covering material to encompass spaced pads disposed lengthwise of the latter, the combination of a cutter mechanism for severing the folded web between the pads to provide the napkins, a feeder mechanism for conducting the folded web to be acted upon by the cutter mechanism, a blower device arranged below said feeder mechanism to prevent the ends at the point of severance of the web from sticking to the cutter mechanism, and napkin carrying off means arranged directly below said cutter and feeder mechanisms and extending forwardly from said cutter mechanism.

29. In a sanitary napkin producing machine of that type for folding a web of covering material to encompass spaced pads disposed lengthwise of the web, the combination of a cutter mechanism for acting upon the folded web between the pads to provide the napkins, a feeder mechanism for conducting the folded web to a position to be acted upon by the cutter mechanism, the latter being arranged forwardly of the feeder mechanism, napkin carrying off means arranged directly under said mechanisms and extended forwardly with respect to said cutter mechanism, and a blower device arranged below said feeder mechanism and above said means to prevent the ends, at the point of severance of the web, from sticking to the cutter mechanism.

EDWARD J. O'NEILL.